Sept. 7, 1943.        T. J. SMULSKI        2,328,930
WINDSHIELD WIPER CONNECTOR
Filed June 29, 1942
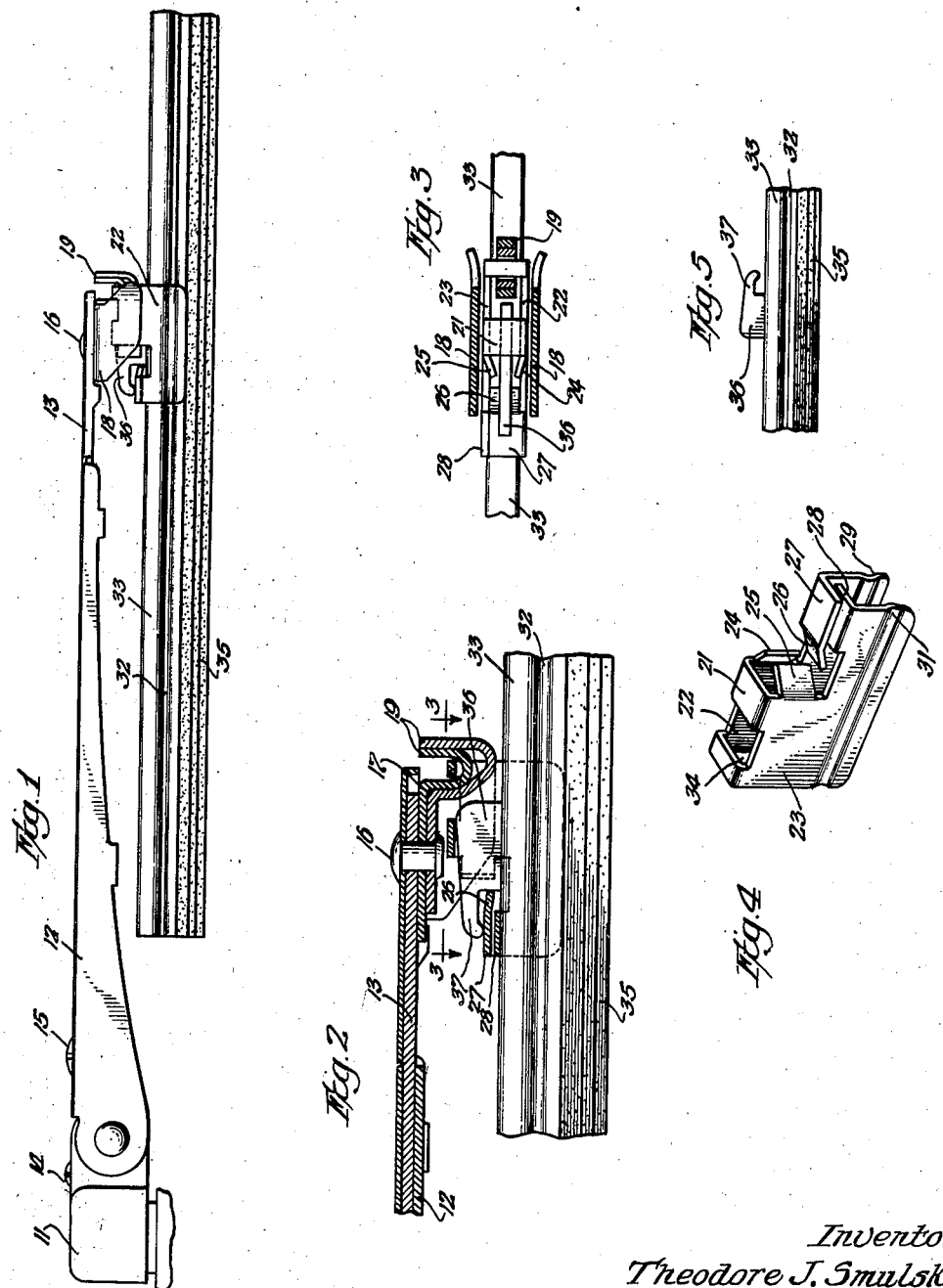
Inventor:
Theodore J. Smulski
By:
Alois W. Graf
Atty.

Patented Sept. 7, 1943

2,328,930

UNITED STATES PATENT OFFICE 2,328,930

WINDSHIELD WIPER CONNECTOR

Theodore J. Smulski, Gary, Ind., assignor to Productive Inventions, Inc., a corporation of Indiana Application June 29, 1942, Serial No. 448,893

6 Claims. (Cl. 15—250)

My invention relates to windshield wiper connectors and more particularly to connector means for assemblying a wiper blade adapted for use with a particular arm and a different type of arm into cooperative relationship.

Among other objects of my invention is intended to provide novel means for connecting the windshield wiper blade and mounting therefor to a windshield wiper arm.

Another object of my invention is to provide novel means which may be readily attached to a windshield wiper blade so that the windshield wiper blade may be connected to an operating arm.

Other and further objects of my invention will become more readily apparent by reference to the following description taken in connection with the accompanying wherein Figure 1 is a side view of a wiper arm, wiper blade, and connector assembly showing the various elements in cooperative relation to each other; Figure 2 is a partial cross-sectional view showing the attachment means at the free end of the arm, the connector and the blade attaching element; Figure 3 is a view taken along the line 33 of Figure 2; Figure 4 is a perspective view of the connector; and Figure 5 is a side view of the wiper blade attaching element.

Referring more particularly to Figure 1, there is shown therein a windshield wiper arm of the multi-section type having an inner section 11, an intermediate section 12 and an outer section 13. The inner section 11 is attached to an actuating shaft or member of a windshield wiper mechanism by any suitable means which may be actuated by a screw 14. The intermediate section 12 is pivotally mounted on the inner section 11 and may be provided with resilient biasing means which may be adjusted by means of a screw 15. The outer section 13 is longitudinally adjustable with respect to the intermediate section 12 so that the windshield wiper blade may be positioned at the proper distance from the actuating shaft of the wiper mechanism. Adjacent the free or outer end of the windshield wiper arm there is provided attachment means secured thereto by a rivet 16 or other suitable fastening means. This attachment means comprises a member having a base portion 17 provided with depending side members or portions 18 and means positioned between the planes of said side portions for receiving the connecting member of a windshield wiper blade which may be in the form of a hook member 19. An arm of the type shown in Figure 1 is described in greater detail and claimed in my copending application for Windshield wiper arms, Serial No. 382,503, filed March 10, 1941. An attachment means of the type shown at the free end of the arm is described in greater detail and claimed in the copending application of John W. Anderson for Windshield wiper arms, Serial No. 282,008, filed June 30, 1939, in which is assigned to the same assignee as the present application.

Reference may now be had to Figure 4 in conjunction with the remaining figures in the drawing whereby it will be seen that there is provided a connector having a base 21 provided with two depending sides 22 and 23 which extend considerably beyond the base 21. Portions of the sides are formed so as to provide a plurality of inwardly projecting fingers 24, 25 and 26. Two inwardly projecting fingers 24 and 25 are formed by bending inwardly vertical portion of the side members 22 and 23. The remaining inwardly projecting finger 26 consists of a part of an overturned portion 27 of the side 26 which is in overlapping relation to an inwardly turned portion 28 of the side 23. The portion 27 and the inwardly projecting finger 26 are preferably spaced apart from a parallel portion 28 so as to provide a certain degree of resilience to these portions. The parallel sides 22 and 23 are each provided with suitable means for engaging the sides of the wiper blade frame so as to prevent vertical movement of the connector with respect to the wiper blade frame and the projecting attaching element. In order to prevent such vertical movement there is provided in the present instance in the depending sides 22 and 23 curved portions 29 and 31 respectively which conform to a groove 32 formed in the side of the wiper blade frame 33. The top portion 21 of the connector is provided with suitable means for receiving the blade attaching member positioned between the parallel sides 18 of the base portion 17 affixed to the outer free end of the arm. As shown, this means may comprise a suitable aperture 34 so arranged that when the hook portion or blade attaching portion at the free end of the wiper arm is inserted therein that the longitudinal movement of the connector with respect to the wiper blade frame and with respect to attaching element projecting therefrom will be limited in one direction. The wiper blade which is shown partially in Figure 3 has a frame or channel 33 provided with grooved portions 32 which support a suitable flexible wiping element 35. Projecting from the back of the frame 33 is a blade attaching element or fin 36 having an overhanging lip or hook portion 37.

Referring now more particularly to Figures 2 and 3 the particular cooperative relation between the connector, the wiper arm, and the wiper blade will readily become apparent. It will be seen that the sides 22 and 23 of the connector engage the sides of the wiper blade frame 33 and that by moving the connector longitudinally as far as possible in one direction, the resilient inwardly turned finger 26 will engage the underside of the lip or hook portion 37 of the attaching fin or attaching element 36 of the blade. The engagement of the end of the inwardly bent finger 26 with the attaching fin 36 prevents further longitudinal movement of the connector in this direction with respect to the blade frame 33 and with respect to the attaching element 36. The attaching means carried by the outer free end of the windshield wiper arm, which in the present instance is the hook 19 is now inserted in the aperture 34. With the hook 19 thus inserted into the aperture 34 the back side of the hook 19 will operate as a stop by engagement with the projecting fin or attaching element 36 so as to prevent any appreciable longitudinal movement of the connector with respect to the other elements. From Figure 3 it will be seen that the depending members 18 of the attachment means being carried by the free end of the arm have a certain amount of clearance between them and the sides 22 and 23 of the connector. This clearance is provided to permit ready assembly of the wiper blade and connector onto the attachment means between the planes of the depending portions 18 mounted on the free end of the arm, and also to limit the degree of axial movement of the wiper blade at the beginning of each wiping stroke of the wiper arm. The inwardly turned fingers 24 and 25 further limit the amount of transverse movement which may occur between the connector and the projecting attaching element or fin 36.

While for the purpose of illustrating and describing my invention a single embodiment thereof has been shown, it is to be understood that I am not to be limited thereto since obviously certain modifications may be made therein without departing from the spirit and scope of my invention as set forth in the appended claims.

What I claim as new and desire to secure by Letters Patent of the United States is:

1. The combination comprising a windshield wiper arm having at the free end thereof an attachment member having spaced means depending therefrom and wiper blade engaging means therebetween, a wiper blade having a blade frame provided with an attaching element, said attaching element having an overhanging hook projecting from the back of the wiper blade frame, a connector for interconnecting said arm attachment member and said blade attaching element comprising a unitary member having a top portion provided with means for receiving said wiper blade engaging means of said arm, a pair of depending sides for engaging the wiper blade frame, and a plurality of inwardly projecting fingers for engaging the sides and the hook of the blade attaching element.

2. In a combination comprising a windshield wiper arm having at the free end thereof attachment means provided with spaced depending members and a wiper blade retaining means therebetween, a wiper blade having an attaching element with an overhanging hook projecting from the back of the wiper blade, a connector for interconnecting the free end of said windshield wiper arm with said wiper blade attaching element comprising a unitary member having a top portion provided with an aperture for receiving said wiper blade retaining means, a pair of depending sides adapted to be positioned between and to be engaged by the depending members of said attachment means and extending into engagement with the wiper blade frame, a pair of inwardly projecting fingers for engaging the sides of the blade attaching element, and resilient means for engaging the hook of the blade attaching element.

3. A connector for interconnecting a windshield wiper arm with a wiper blade having a blade frame provided with a vertically positioned hook fin, said connector comprising a unitary member having a top portion and two depending sides of greater length than said top portion, said top portion being provided with means for receiving a portion of said arm, each of said sides which extend beyond said top portion being formed to have a vertical finger portion extending inwardly at an acute angle to its side and another portion arranged horizontally in overlapping relation to a similar portion of the other side, said sides having configurations to conform to and to engage the frame of a wiper blade, and said finger portions and said overlapping portions each being positioned so as to engage the hook fin supported by the wiper blade frame.

4. The combination of attachment means mounted on the free end of a windshield wiper arm, said means comprising a base with depending members and a hook positioned therebetween, an attaching element projecting from the back of a windshield wiper frame, and a connector interconnecting said blade attaching element with said arm attachment means, said connector having a top portion, a pair of depending sides and a plurality of inwardly projecting fingers, said sides being arranged to engage the wiper blade frame, said fingers being arranged to limit the sidewise movement and the longitudinal movement in one direction of said connector relative to said blade attaching element, said top portion being provided with an aperture for receiving said arm hook, said connector being so constructed and arranged that the sides of said connector will be positioned between the depending members of said arm attachment means and said hook will be positioned so as to limit the longitudinal movement of said connector in the other direction relative to said blade attaching element.

5. The combination of attachment means mounted on the free end of a windshield wiper arm, said means comprising a base with depending portions and a hook therebetween, an attaching fin projecting from the back of a windshield wiper blade frame and having an overhanging lip, and a connector interconnecting said blade attaching fin with said arm attachment means, said connector having a top portion, a pair of depending sides, a horizontal resilient portion, and a plurality of inwardly projecting fingers, said sides being positioned in engagement with the frame of a windshield wiper blade to prevent vertical movement of said connector relative to said frame and said attaching fin, said fingers being arranged to limit the transverse movement relative to said blade attaching fin, said horizontal resilient portion being positioned in engagement with the overhanging lip of said attaching fin to limit the longitudinal movement in one direction of said connector relative to said attaching fin, said top portion being provided with means for receiving said arm hook, said portion and said means being of such character that said connector will be positioned between the depending portions of said arm attachment means and said hook will be positioned so as to limit the longitudinal movement of said connector in the other direction relative to said blade attaching fin.

6. The combination of attachment means mounted on the free end of a windshield wiper arm, said means comprising a member having a base with sides depending therefrom and means positioned between the respective planes of said sides for receiving the connector of a wiper blade, a windshield wiper blade having a frame provided with an attaching fin projecting from the back thereof, and a connector interconnecting said windshield wiper blade with said arm attachment means, said connector having a top portion, a pair of depending sides and a plurality of inwardly projecting fingers, said sides being positioned in engagement with the frame of said wiper blade to prevent vertical movement of said connector with respect to said frame, said fingers being arranged to limit the longitudinal movement in one direction and transverse movement of said connector relative to said frame and said attaching fin, said top portion being provided with means for receiving said arm connector receiving means, and being of such construction and arrangement that said arm connector receiving means will be positioned with respect to said connector as to limit the longitudinal movement of the connector in the other direction and the sides of said connector will be positioned between the sides of said arm attachment means to limit the rocking movement of the wiper blade about the longitudinal movement of the axis thereof at the beginning of each stroke of said arm.

THEODORE J. SMULSKI.